May 28, 1968     O. ACKERMANN     3,385,733
MANUFACTURE OF CARAMEL COLOR
Filed July 9, 1964
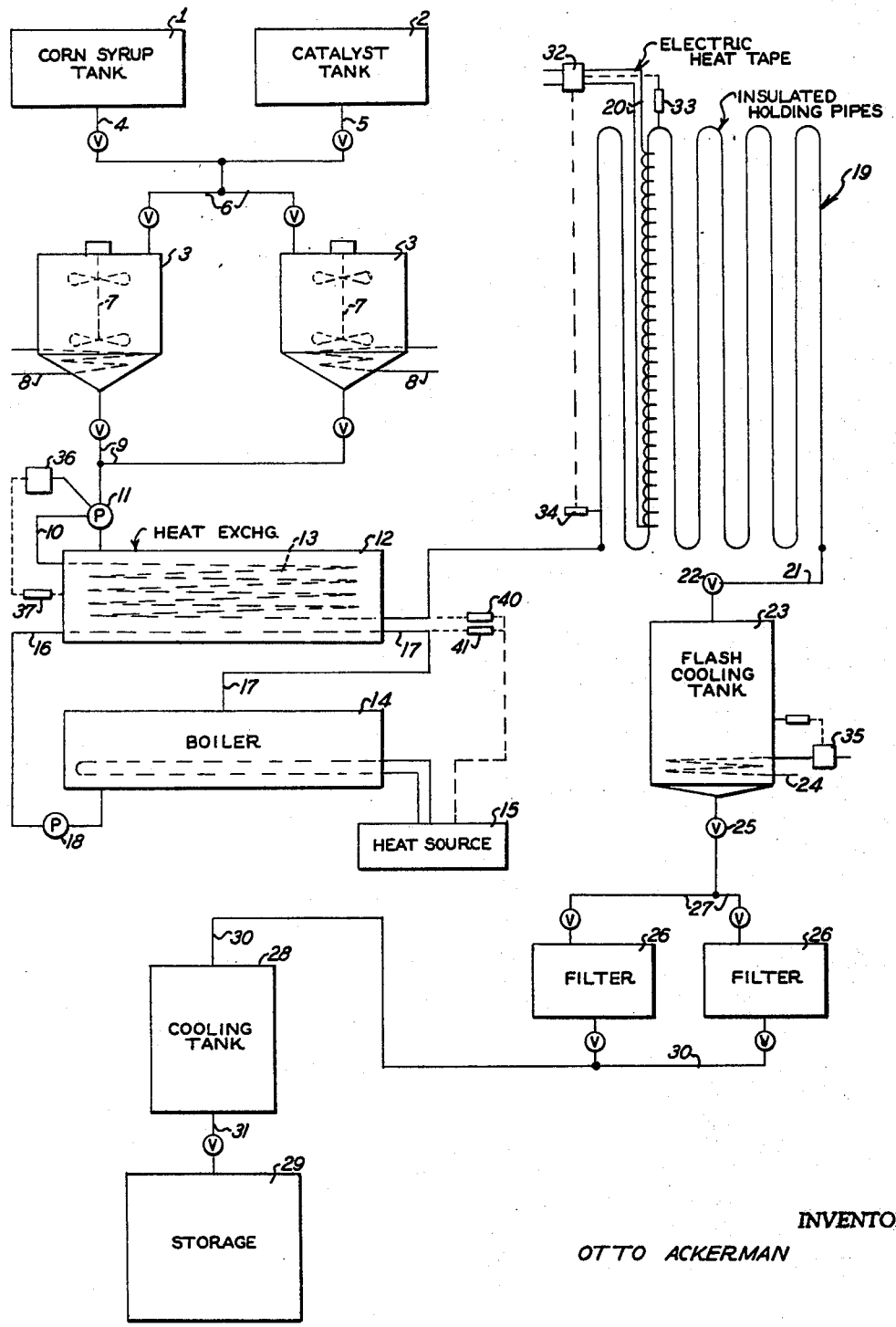
INVENTOR
OTTO ACKERMAN
BY *Dayton R. Stemple, Jr.*
ATTORNEY

United States Patent Office 3,385,733
Patented May 28, 1968

3,385,733
MANUFACTURE OF CARAMEL COLOR
Otto Ackermann, Long Island City, N.Y., assignor to D. D. Williamson & Co., Inc., Long Island City, N.Y., a corporation of New York
Filed July 9, 1964, Ser. No. 381,354
5 Claims. (Cl. 127—34)

This invention relates to the manufacture of caramel color and more particularly to a high-temperature, short period continuous process of manufacturing caramel color and to apparatus for carrying out the process.

Caramel is the amorphous dark brown material resulting from the controlled heat treatment of carbohydrate food materials. It has long been used for imparting a dark brown color to numerous food products, especially liquids such as soft drinks and certain spirits.

Hitherto caramel has generally been made on a large scale by a batch process. For example, sugar syrup may be treated in an autoclave at about 280° F. and 60 pounds per square inch (p.s.i.) pressure. This treatment may require 5 or more hours heating and a total cycle of 8 or more hours. It is not only time consuming but has two other disadvantages. Firstly, it ties up heavy equipment representing considerable capital investment for unduly long periods of time. Secondly, during batch processing, the unloading takes at least an hour, during which time the polymerization continues. Accordingly, it is necessary to start unloading lighter material and finish with darker material to average the desired degree of polymerization, thus making precise control and uniform treatment difficult.

Accordingly, it is one object of this invention to provide a caramelizing process that is rapid and makes less time demand on the apparatus used per unit of product produced.

It is another object of this invention to provide such a process in which the conditions obtaining in the reaction zone are relatively constant per unit time.

It is also an object of this invention to permit precise control quality and quantities over the end product.

It is a further object of this invention to provide a process particularly adapted to precise automatic regulation.

With these and other objects and features in view, the nature of which will be more apparent, the invention will be more clearly understood by reference to the drawings, the accompanying detailed description and the appended claims.

According to this invention a food carbohydrate syrup is blended with a suitable catalyst, the mixture is preferably preheated and is then pumped at a relatively high pressure through heat exchange pipes immersed in a temperature-stable heating medium heated to a relatively high temperature. The treated syrup is released through a pressure-reducing valve into a cooling tank and filtered. The filtrate may be dispensed as the final product or may be dried to a solid as by spray-drying, tray-drying or otherwise.

Such a process is readily controlled automatically. The ratio of catalyst to carbohydrate can be established and controlled by variable proportionating pumps, the temperature of the heat-exchange liquid can be thermostatically controlled, the velocity of the material in process through the heat-exchange pipes and the time in the heating zone is readily controllable by the use of variable-delivery pumps and the pressure at which the treated product is released into the cooling zone can be controlled by suitable adjustment of the reducing valve. Furthermore, the setting of one or more of these adjustable control means can be determined and varied automatically in accordance with the setting in another of the control means by suitable instrumentation available commercially. For example, the rate of delivery of syrup-catalyst mixture to the heat exchanger can be made automatically, dependent on the temperature in the latter. Accordingly, all the produced color will have the desired degree of caramelization without resorting to averaging techniques.

It has been found that in the present process advantageous conditions of treatment are a temperature range of 212°–1000° F. with a preferred range of 350–400° F. and a pressure range of 150–225 p.s.i. In the temperature range 350–400° F. the time of heating of the syrup-catalyst mixture in the heat exchanger should be 5 to 300 minutes, depending on the degree of coloring or optical density desired. At 1000°, the time required is almost instantaneous, whereas at 212° it might take 48 hours, depending on the available catalyst. The heating times of 5 to 300 minutes correspond to a through-put of 0.5–20 gallons per minute in a single-pass heating coil having an internal diameter of 3 inches and a length of 300 feet. Time, temperature and optical density are three closely related variables that may be varied widely as will be appreciated by those skilled in this art.

Among the conventional carbohydrates that may be treated according to this invention are cornstarch hydrolyzates, sucrose, dextrose, invert sugar, molasses and malt syrup with corn sugar syrup being preferred.

The conventional caramelization catalyst may be a physiologically acceptable acid such as phosphoric, sulfuric or sulfurous acid, an alkali such as ammonium, potassium or sodium hydroxide, an ammonium, sodium or potassium salt of the listed acids or of carbonic acid, or a mixture of two or more of these with a mixture of sodium acid sulfite and ammonium sulfate being preferred.

In the drawings; the sole figure is a diagrammatically illustrated flow sheet showing one form of apparatus for carrying out the process.

An example of a preferred embodiment of this invention and of modifications thereof is described below, but is intended to be illustrative only and not to limit the invention, the scope of which is defined in the appended claims.

Tank 1 contains 42° Baumé corn sugar syrup of 80 DE (dextrose equivalent) at a pH of 4.0 and tank 2 contains a catalyst mixture comprising sodium acid sulfite and ammonium sulfate in the weight ratio of 4 to 1. 1,000 gals. of syrup and 250 lbs. of catalyst are transferred to either one of mixing tanks 3 by means of valved pipes 4, 5 and 6. Each tank 3 is provided with a stirrer 7 and a heating coil 8 connected with a suitable heat source (not shown). The sugar-catalyst mixture is thoroughly agitated and preheated (for convenience only) to 150° F.

The mixed preheated charge of one of the tanks 3 is then pumped by valved pipes 9 and 10 and variable speed pump 11 into and through heat exchanger 12 where it is heated to 350° F. The sugar-catalyst mixture passes through coil 13 in the heat exchanger, the coil being immersed in a thermostable liquid heating medium such, for example, as "Dowtherm A" (a eutectic mixture of diphenyl and diphenyl oxide, stable to 725° F., boiling point to 258° C. and freezing point 12° C.).

The heat required to maintain the desired temperature in the heat exchanger is supplied from boiler 14 in which the "Dowtherm A" is heated by any suitable heat source 15 such as steam or electricity. The heat exchange medium is continuously circulated through the heat exchanger and boiled by pipes 16 and 17 and pump 18 as indicated. Steam or other hot gases can be circulated through the heat exchanger 12 but liquid is highly preferred, as steam or gases will carbonize the sugar even though there is no physical contact.

From the heat exchanger 12 the sugar-catalyst mixture passes through a bank of holding pipes 19 where the syrup undergoes final caramelization at or near the sugar temperature reached in exchanger 12. In other words, sufficient heat is supplied at 12 to reach the caramelization temperature and at 19 merely to maintain the level reached at 12. Pipes 13 and 19 are of stainless steel and pipes 19 are insulated. Auxiliary heat may also be supplied to the latter to prevent too great a temperature drop, as by electric heating tape 20. The caramelized syrup leaves pipes 19 by pipe 21 and issues through pressure-reducing valve 22 into flash cooling tank 23 at substantially atmospheric pressure. The pressure in the system from pump 11 to reducing valve 22 may be of the order of 150–225 p.s.i. due to steam from the syrup and gases liberated by the caramelization reaction.

Tank 23 is provided with a cooling coil 24 and a valved outlet 25. From tank 23 the caramel syrup when partially cooled is dropped to either of the filters 26 by valved pipes 27 whence the filtrate is run to final cooling tank 28 and storage tank 29 by valved pipes 30 and 31. The syrup could also be spray-dried at this point or foamed with nitrogen and allowed to shelf-dry, if a dried end product is desired.

Duplicate tanks 3 are provided so that while the charge in one is being pumped through the system, a new charge may be prepared in the other. Similarly duplicate filters 26 permit cleaning one filter while the other is in operation. These filters may be of any suitable conventional type.

Automatic operation of the process may be effected in several ways, the aim being to balance the temperature of polymerization and the time of exposure of the sugar to the caramelization temperature. Thus the temperature of the syrup in pipes 13 and 19 must be regulated in accordance with the velocity of the syrup through these pipes. Within limits the higher the temperature, the greater the velocity must be and consequently the shorter the time in the heating zone.

For example, once the apparatus has been standardized, pump 11 can be set going at a determined delivery rate after the temperature in the heat exchanger has been raised sufficiently to provide the desired temperature at the syrup exit thermometer 40. This latter can be controlled to provide a suitable differential with the temperature of the circulating heat-exchange medium by means of a differential thermostat 41 acting on heat source 15.

Electric heating tape 20 can also be controlled by a differential thermostatic switch 32 and thermometers 33 and 34 to regulate the temperature drop from heat exchanger 12 to pipes 19. A thermostatic valve 35 may also be used to control cooling coil 24 in tank 23.

Should undue variations occur in the temperature of the circulating syrup, the velocity of circulation is advantageously changed by a corresponding increase with rise in temperature and decrease with temperature drop. This may be effected by a throttling control 36 on the power source driving the pump sensitive to the indications of thermostat 37.

It will be obvious from this description that modifications of this route of automatic control can be employed by the use of conventional commercially available temperature and flow-control instruments to balance the temperature of carmalization with the time of exposure of the material under treatment to that temperature.

What is claimed is:

1. The continuous process of producing caramel color which comprises, preparing a syrup of carbohydrate food material, mixing therewith a caramelization catalyst, pumping the mixture through a heat exchanger, heating the mixture as it passes through said heat exchanger to a caramelizing temperature in the range of 350° to 1000° F. with a liquid heat exchange medium to avoid carbonizing said mixture, maintaining the flowing mixture at the caramelizing temperature for a period up to 300 minutes, discharging the caramelized mixture through a pressure-reducing valve, and cooling and recovering the caramel color thus produced.

2. The process of claim 1 in which the carbohydrate is selected from the class consisting of cornstarch hydrolyzates, sucrose, dextrose, invert sugar, molasses, malt syrup and mixtures thereof.

3. The process of claim 1 in which the caramelizing temperature is in the range of 350° to 400° F.

4. The process of claim 3 in which the carbohydrate is selected from the class consisting of cornstarch hydrolyzates, sucrose, dextrose, invert sugar, molasses, malt syrup and mixtures thereof.

5. The continuous process of producing caramel color which comprises continuously circulating at the stated ratios 20 gallons 42° Baumé corn sugar of 80 dextrose equivalent and at a pH of 4.0, 4 lbs. sodium acid sulfite and 1 lb. ammonium sulfate, through a heating zone, heating the mixture in the heating zone to about 350°–400° F. with a liquid heat exchange medium whereby super-atmospheric pressure is developed in the heating zone, maintaining the mixture circulating in the heating zone at a caramelizing temperature in the neighborhood of 350°–400° F. for a period of 5 to 300 minutes, discharging the caramelized mixture to atmospheric pressure, and cooling and recovering the caramel color thus produced.

References Cited

UNITED STATES PATENTS

| | | | |
|---|---|---|---|
| 2,582,261 | 1/1952 | Longenecker | 127—34 |
| 2,784,118 | 3/1957 | Pyle et al. | 127—34 |
| 3,214,294 | 10/1965 | Meisel | 127—34 |
| 2,835,589 | 5/1958 | Whitfield | 99—134 |

A. LOUIS MONACELL, *Primary Examiner.*

H. H. KLARE, *Assistant Examiner.*